US011124077B2

(12) United States Patent
Wang et al.

(10) Patent No.: US 11,124,077 B2
(45) Date of Patent: *Sep. 21, 2021

(54) AUTOMOBILE CHARGER (71) Applicant: PILOT INC., City of Industry, CA (US)

(72) Inventors: Calvin Shiening Wang, City of Industry, CA (US); Chung-Hsin Wang, Shenzhen (CN)

(73) Assignee: PILOT INC., City of Industry, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/236,260

(22) Filed: Apr. 21, 2021

(65) Prior Publication Data

US 2021/0237589 A1    Aug. 5, 2021

Related U.S. Application Data (63) Continuation of application No. 17/131,113, filed on Dec. 22, 2020, which is a continuation of application (Continued)

(30) Foreign Application Priority Data

Apr. 28, 2014    (CN) .......................... 201420212173.5

(51) Int. Cl.
*H02J 7/00*        (2006.01)
*B60L 53/00*       (2019.01)
(Continued)

(52) U.S. Cl.
CPC ............... *B60L 53/00* (2019.02); *B60L 53/53* (2019.02); *H02J 7/0034* (2013.01);
(Continued)

(58) Field of Classification Search
CPC ....................................................... B60L 53/00
(Continued)

(56) References Cited

U.S. PATENT DOCUMENTS 3,267,452 A    8/1966 Wolf
3,343,057 A    9/1967 Smith
(Continued)

FOREIGN PATENT DOCUMENTS

AU           694452 B2    7/1998
AU           6997198 A    7/1998
(Continued)

OTHER PUBLICATIONS

U.S. Appl. No. 17/236,279, filed Apr. 21, 2021, Wang et al.
(Continued)

*Primary Examiner* — Yalkew Fantu
(74) *Attorney, Agent, or Firm* — Jason H. Vick; Sheridan Ross, PC (57) ABSTRACT A novel automobile charger which comprise a direct current voltage, wherein a positive pole of the direct current voltage is connected with one end or lead of a DC to DC module, one end of a battery voltage detection module and one end of a load module simultaneously, while a negative pole of the battery is connected with the other end of the DC to DC module, one end of a microcontroller, one end of the automobile start control module and the other end of the battery voltage detection module simultaneously. A third end of the DC to DC module is connected with the other end of the microcontroller, the other three ends of which are connected with the third end of the battery voltage detection module, the other end of the automobile start control module and one end of the load detection module respectively. The other end of the load detection module is connected with the
(Continued)

third end of the automobile start control module and the other end of the load module simultaneously.

24 Claims, 2 Drawing Sheets

Related U.S. Application Data

No. 16/404,321, filed on May 6, 2019, now Pat. No. 10,875,410, which is a continuation of application No. 15/923,219, filed on Mar. 16, 2018, now Pat. No. 10,328,806, which is a continuation of application No. 15/355,409, filed on Nov. 18, 2016, now Pat. No. 10,046,653, which is a continuation of application No. 14/569,352, filed on Dec. 12, 2014, now Pat. No. 9,525,297.

(51) Int. Cl.
*B60L 53/53* (2019.01)
*H02J 9/00* (2006.01)

(52) U.S. Cl.
CPC ........... *H02J 7/0068* (2013.01); *H02J 7/0029* (2013.01); *H02J 9/005* (2013.01); *H02J 2207/20* (2020.01)

(58) Field of Classification Search
USPC ........................................................ 320/109
See application file for complete search history.

(56) References Cited

U.S. PATENT DOCUMENTS

| | | |
|---|---|---|
| 3,590,357 A | 6/1971 | Reid |
| 3,950,668 A | 4/1976 | Mattis et al. |
| 3,950,688 A | 4/1976 | Sancey et al. |
| 4,871,957 A | 10/1989 | Taranto et al. |
| 5,319,298 A | 6/1994 | Wanzong et al. |
| 5,487,002 A | 1/1996 | Diller et al. |
| 5,793,185 A * | 8/1998 | Prelec .................. H02J 7/0042 320/104 |
| 5,831,350 A | 11/1998 | McConkey et al. |
| 6,057,667 A | 5/2000 | Mills |
| 6,130,519 A | 10/2000 | Whiting et al. |
| 6,144,110 A | 11/2000 | Matsuda et al. |
| 6,160,381 A | 12/2000 | Peterzell |
| 6,212,054 B1 | 4/2001 | Chan |
| 6,249,106 B1 | 6/2001 | Turner et al. |
| 6,262,492 B1 | 7/2001 | Sheng |
| 6,271,605 B1 | 8/2001 | Carkner et al. |
| 6,344,733 B1 | 2/2002 | Crass et al. |
| 6,351,102 B1 | 2/2002 | Troy |
| 6,362,599 B1 | 3/2002 | Turner et al. |
| 6,424,158 B2 | 7/2002 | Klang |
| 6,426,606 B1 | 7/2002 | Purkey |
| 6,459,175 B1 | 10/2002 | Potega |
| 6,632,103 B1 | 10/2003 | Liu |
| 6,774,607 B2 | 8/2004 | Moseneder et al. |
| 6,803,743 B2 | 10/2004 | George et al. |
| 6,919,704 B1 | 7/2005 | Healey |
| 7,002,265 B2 | 2/2006 | Potega |
| 7,199,555 B2 | 4/2007 | Hung |
| 7,339,347 B2 | 3/2008 | Elder et al. |
| 7,345,450 B2 | 3/2008 | Krieger et al. |
| 7,508,171 B2 | 3/2009 | Carrier et al. |
| 7,579,811 B2 | 8/2009 | Sato et al. |
| 7,656,118 B2 | 2/2010 | Krieger et al. |
| 7,675,261 B2 | 3/2010 | Elder et al. |
| 7,839,117 B2 * | 11/2010 | Elder .................. H01M 10/122 320/104 |
| 8,072,900 B2 | 12/2011 | Antal et al. |
| 8,125,181 B2 | 2/2012 | Gregg et al. |
| 8,172,603 B1 | 5/2012 | Richardet, Jr. |
| 8,183,821 B2 | 5/2012 | Sakurai |
| 8,253,376 B2 | 8/2012 | Gale et al. |
| 8,447,543 B2 | 5/2013 | Dickinson et al. |
| 8,565,930 B2 | 10/2013 | Miwa |
| 8,692,513 B2 | 4/2014 | Gaul et al. |
| 8,723,477 B2 | 5/2014 | Gaul et al. |
| 8,994,327 B2 | 3/2015 | Kusch et al. |
| 9,007,015 B1 | 4/2015 | Nook et al. |
| 9,007,023 B2 | 4/2015 | Dao |
| 9,248,746 B2 | 2/2016 | Wen |
| 9,263,717 B2 | 2/2016 | Nakano et al. |
| 9,263,907 B2 | 2/2016 | Richardson et al. |
| 9,287,725 B2 | 3/2016 | Huffman et al. |
| 9,333,865 B2 | 5/2016 | Kawasaki |
| 9,352,652 B2 | 5/2016 | Montemayor Cavazos et al. |
| 9,412,994 B2 | 8/2016 | Koebler |
| 9,496,728 B2 | 11/2016 | Lei |
| 9,506,446 B2 | 11/2016 | Xinfang |
| 9,525,297 B2 | 12/2016 | Wang et al. |
| 9,871,392 B2 | 1/2018 | Durand et al. |
| 9,874,611 B2 | 1/2018 | Whiting et al. |
| 9,954,391 B2 | 4/2018 | Lei |
| 10,046,653 B2 | 8/2018 | Wang et al. |
| 10,328,806 B2 | 6/2019 | Wang et al. |
| 10,875,410 B2 * | 12/2020 | Wang .................. H02J 7/0063 |
| 2001/0038276 A1 | 11/2001 | Resch et al. |
| 2002/0075003 A1 | 6/2002 | Fridman et al. |
| 2003/0096158 A1 | 5/2003 | Takano et al. |
| 2004/0066168 A1 | 4/2004 | George et al. |
| 2004/0130298 A1 | 7/2004 | Krieger et al. |
| 2005/0110467 A1 | 5/2005 | Thomason |
| 2005/0162124 A1 | 7/2005 | Bertness et al. |
| 2005/0212521 A1 | 9/2005 | Bertness |
| 2005/0258797 A1 * | 11/2005 | Hung .................. H02J 7/342 320/105 |
| 2006/0244412 A1 * | 11/2006 | Bonzer ............... H02J 7/00309 320/105 |
| 2009/0008374 A1 | 1/2009 | Fosbnder |
| 2009/0174362 A1 | 7/2009 | Richardson et al. |
| 2010/0013302 A1 | 1/2010 | Howell et al. |
| 2010/0055546 A1 | 3/2010 | Elder et al. |
| 2010/0173182 A1 | 7/2010 | Baxter et al. |
| 2010/0181959 A1 | 7/2010 | Gibbs et al. |
| 2010/0244766 A1 | 9/2010 | Olsberg |
| 2010/0301800 A1 | 12/2010 | Inskeep |
| 2011/0127947 A1 | 6/2011 | Hunter et al. |
| 2011/0216451 A1 | 9/2011 | Haines et al. |
| 2011/0279089 A1 | 11/2011 | Yeo |
| 2012/0013189 A1 | 1/2012 | Jenkins |
| 2012/0025763 A1 | 2/2012 | Hsiao et al. |
| 2012/0068662 A1 | 3/2012 | Durando et al. |
| 2012/0139498 A1 | 6/2012 | Chang |
| 2013/0015814 A1 | 1/2013 | Kelty et al. |
| 2013/0154543 A1 | 6/2013 | Richardson et al. |
| 2013/0241488 A1 | 9/2013 | Dao |
| 2013/0241498 A1 | 9/2013 | Koebler |
| 2014/0159509 A1 | 6/2014 | Inskeep |
| 2015/0012174 A1 | 1/2015 | Kim et al. |
| 2015/0032312 A1 | 1/2015 | Lambrinos et al. |
| 2015/0212135 A1 | 7/2015 | Jin et al. |
| 2015/0340907 A1 | 11/2015 | Lei |
| 2016/0079776 A1 | 3/2016 | Iguchi et al. |
| 2018/0201141 A1 * | 7/2018 | Wang .................. B60L 53/00 |
| 2021/0107365 A1 | 4/2021 | Wang et al. |

FOREIGN PATENT DOCUMENTS

| | | |
|---|---|---|
| CN | 201947042 U | 8/2011 |
| CN | 202696190 U | 1/2013 |
| CN | 103066662 A | 4/2013 |
| CN | 203211234 U | 9/2013 |
| CN | 203522157 U | 4/2014 |
| DE | 202013102599 U1 | 8/2013 |
| EP | 1673828 B1 | 5/2013 |
| JP | 2015-115979 A | 6/2015 |
| WO | WO 00/24108 | 4/2000 |
| WO | WO 2010/129723 | 11/2010 |
| WO | WO 2012/080996 | 6/2012 |

(56) References Cited

FOREIGN PATENT DOCUMENTS

OTHER PUBLICATIONS

U.S. Appl. No. 17/236,302, filed Apr. 21, 2021, Wang et al.
U.S. Appl. No. 17/236,339, filed Apr. 21, 2021, Wang et al.
"AAA Oregon Deploys PowerSafe Jump Start Systems" www.powersafejumpercables.com; Mar. 17, 2011.
Asia Bright Industrial (H.K.) Co. Ltd. "JPR 9000M Series—Mini Jump Start—Product Datasheet" Apr. 22, 2013.
Asia Bright Industrial (H.K.) Co. Ltd. "JPR M Series—Mini Jump Start—Product Datasheet" Date Unknown.
Battery Extender® Model BE01258 Lithium Ion Jump Starter, Fuel Pack and Backup Power Owner's Manual, Schumacher Electric Corporation, date unknown, 19 pages.
Black & Decker "Start-It Jump 'n Charge Smart Battery Charger / Jump-Starter" Vector Manufacturing 2006.
Black & Decker "Start-It Jump Starter 12 Volt DC Power Supply Cordless & Rechargeable—User's Manual & Warranty Information "Vector Manufacturing; 2005.
Bradford, "Re: Pilot Notice of Infringement (Amazon Case ID: 7131799991)," Jul. 9, 2020, 9 pages.
Crenshaw "Coming to SEMA: Fool-Proof Jumper Cables," RIDES, Oct. 28, 2010, 4 pages.
Coolest Gadgets "Juno Power Announces the JUMPR External Battery" Apr. 25, 2014.
Cunningham, Wayne "Three Pocket-Size Jump Starters" Road / Show by Cnet; Apr. 28, 2014.
DieHard "Owner's Manual—Portable Power 950 Jump Starter and DC Power Source: Model No. 200.71487" Sears, Roebuck and Co.; Dec. 2005.
DieHard "Portable Power 950 Product Packaging," available before Apr. 28, 2014, 1 page.
Edelstein, Stephen "Lithium-Ion Batteries for Lighter, Compact Jump-Starting Pack" Apr. 26, 2014.
"E-Power-21," Shenzhen Carku Technology Co., Ltd., Date Unknown, 1 page.
Fairchild Semiconductor "LM78XX/LM78XXa: 3-Terminal 1A Positive Voltage Regulator" Fairchild Semiconductor Corporation; Mar. 2008.
Francisco, Kevin Bruce "This Power Bank Charges Phones and Jurnpstarts Cars" Yuga Tech; Apr. 25, 2014.
"Function and jumpstart short cut Description," axhess GmbH & Co. Kg., date unknown, 1 page.
Goodwin, Antuan "PowerSafe Jumper Cables Take Danger out of Playing with Electricity" Road / Show by Cnet; Nov. 4, 2009.
Holtek "HT75XX-1; 100mA Low Power LDO" Rev. 1.50; Jan. 12, 2006.
"Intelligent Jumper Cable," Shenzhen Carku Technology Co., Ltd., Date Unknown, 1 page.
"JPR Series Jump Starter: JPR-1800M / 2600M / 4500M / 9000M / 9024M," BatteryFighter, 2014.
"Jump Starter Instructions," Shenzhen Carku Technology Co., Ltd., Date Unknown, 1 page.
"Latest News—Projecta website," Brown & Watson International Pty Ltd., 2017, 5 pages.
Lithium Ion Jump Starter, Fuel Pack and Backup Power—Owners Manual; Schumacher Electric Corporation; Date Unknown.
"Lithium Starthilfe Booster Energiestation mit USB—Jump Starter JPR4500," Amazon.com, first available Jan. 26, 2013, 3 pages.
Moynihan, Tim " Small but Mighty Charger Juices Tables and Jump-Starts Cars" Wired: Gear; Apr. 25, 2014.
"mPower Jump Mini User Manual," mPower Technologies, Inc., date unknown, 1 page.
"mPower Jump User Manual," mPower Technologies, Inc., date unknown, 1 page.
Murphy, David "Jump Start Your Car with Portable 'Jumpr' Device" PCMag; Apr. 25, 2014.
Peak "900 Peak Amp Jump-Starter: Model No. PKCOAz; Owner's Manual and Warranty Information" 2014.

Powerall "Portable Power Bank Battery Jump Starter LED Flashlight—Owner's Manual" Date Unknown.
"PowerSafe Jumper Cables SEMA Global Media Aware Winner" Oct. 23, 2010.
"Product Review: Pocket Charger/Jump Starter," TexasBowhunter.com, Apr. 16, 2014, 6 pages.
Profi Power Germany 12VDC Mini Jump Start "Power Punch: Für Geräte: JPR 9000P, JPR 4500P, JPR 4500 6V, JPR 2600P, JPR 1800P, mit 5v USB 2.0 Power Outlet 2000mA" axhess GmbH & Co. KG, 2013, 25 pages.
Profi Power Germany 12VDC Mini Jump Start "Power Punch: Für Geräte: JPR 4500P, JPR 2600P, JPR 1800P" axhess GmbH & Co. KG, 2013, 9 pages.
Profi Power Germany "Power Punch: 12VDC Mini Jump Start—User Manual" axhess GmbH & Co. Kg; 2013; 8 pages.
"Profi Power Starthilfe Mini Jump JPR4500," Amazon.com, first available Jun. 4, 2013, 3 pages.
Projecta 3000A 12/24V High Cranking Sure Start Jumpstarter Oct. 2011.
Projecta New Projecta Jump Starters Lift the Bar: Apr. 12, 2012.
Ramsey, Jonathon "Srnartphone Battery Backup that will Jump Start Your Car" Autoblog; Apr. 28, 2014.
"Redfuel Powered by Schumacher: Model SL1: Lithium Ion Jump Starter, Fuel Pack and Backup Power: Owner's Manual" Date Unknown.
"Redfuel Powered by Schumacher: Model SL65 Jump Starter Arrancador—Owner's Manual" Date Unknown.
"Rescue® Portable Power Pack Instructions," Quick Cable Corporation, before 2014, 20 pages.
"Rescue® Portable Power Pack Model 2100 Product Specifications," QuickCable, as early as 28, 2014, 2 pages.
"RFDPPJS2976DLX Portable Charge-All/Jump Starter User Manual," Rockford Consumer Products, date unknown.
"Rockford PP2976DLXA Portable Power Source—Mini Jump Starter," Amazon.com, date unknown, 14 pages.
Sealey "LSTART Range: 12V Compact Lithium-ion Jump Starts" Date Unknown.
Sema "Tools for Making the Job Quicker, Easier, Better" Sema eNews Vo. 14, No. 34, Aug. 25, 2011.
"SHF12000-12 Instruction Sheet," Hangzhou Haijiu Battery Co. Ltd, prior to Dec. 13, 2013, 3 pages.
"SL1312 Jump Starter/Power Pack Owner's Manual," Schumacher Electric Corporation, date unknown, 35 pages.
"SL1314 Jump Starter/Power Pack Owner's Manual," Schumacher Electric Corporation, date unknown, 35 pages.
"SL1315 Jump Starter/Power Pack Owner's Manual," Schumacher Electric Corporation, date unknown, 24 pages.
"SL1316 Lithium ion Jump Starter, Fuel Pack and Backup Power Owner's Manual," Schumacher Electric Corporation, date unknown, 32 pages.
"SL1317 Jump Starter Owner's Manual," Schumacher Electric Corporation, date unknown, 35 pages.
"SL1327 Jump Starter Owner's Manual," Schumacher Electric Corporation, date unknown, 35 pages.
"SL1338 Jump Starter/Power Pack Owner's Manual," Schumacher Electric Corporation, date unknown, 35 pages.
"SL1391, SL1398, SL1399 Lithium Ion Tactical Jump Starter ight Owner's Manual," Schumacher Electric Corporation, date unknown, 39 pages.
"SL1391U, SL1398U, SL1399U Lithium Ion Tactical Jump Starter Light Owner's Manual," Schumacher Electric Corporation, date unknown, 111 pages.
"SL1396 Power Pack Owner's Manual," Schumacher Electric Corporation, date unknown, 24 pages.
"Smart Automatic Battery Charger Owner's Manual," Vector Manufacturing, Ltd., date unknown, 12 pages.
"Smart Jumper Cable," Shenzhen Carku Technology Co., Ltd., Date Unknown, 1 page.
Stanley "450 Amp Jump-Starter With Compressor Instruction Manual," Baccus Global LLC, 2014, 10 pages.
Stanley "Digital Portable Power Station Instruction Manual, DPS109" Baccus Global, Apr. 29, 2009, 10 pages.

(56) References Cited

OTHER PUBLICATIONS

Stanley "Lithium-Ion Jump-Starter Instruction Manual, LI1000," Baccus Global, Jul. 28, 2011, 10 pages.
"Startmonkey 400 Quik Start Guide," Powertraveller Limited, date unknown, 2 pages.
"Summary of invalidity defenses against asserted claims of Pilot's U.S. Pat. No. 10,046,653," Date Unknown, 17 pages.
Ward, Mike "Jumper Cables Avoid Surges" Product News; May 1, 2011.
"Why PowerSafe Jumper Cables are Necessary" Energy Safe Technologies; 2011.
Notification to Grant a Patent Right for Utility Model for Chinese Patent Application No. 201420212173.5, dated Jul. 17, 2014.
Ex Parte Quayle Action for U.S. Appl. No. 14/569,352, mailed Aug. 31, 2016.
Notice of Allowance for U.S. Appl. No. 14/569,352, dated Oct. 13, 2016.
Office Action for U.S. Appl. No. 15/355,409, dated Dec. 14, 2017.
Office Action for U.S. Appl. No. 15/355,409, dated May 3, 2018.
Notice of Allowance for U.S. Appl. No. 15/355,409, dated Jun. 21, 2018.
Ex Parte Quayle Action for U.S. Appl. No. 15/923,219, mailed Jan. 8, 2019.
Notice of Allowance for U.S. Appl. No. 15/923,219, dated Apr. 5, 2019.
Office Action for U.S. Appl. No. 16/404,321, dated Apr. 27, 2020.
Notice of Allowance for U.S. Appl. No. 16/404,321, dated Aug. 26, 2020.
Corrected Notice of Allowance for U.S. Appl. No. 16/404,321, dated Oct. 13, 2020.
Petition for Inter Partes Review of U.S. Pat. No. 9,525,297, including Exhibits 1001-1011; Case No. IPR 2018-00488, filed Jan. 13, 2018 (439 pages).
Documents filed with *Winplus North America, Inc. v. Pilot, Inc.*; United States Patent and Trademark Office—Before the Patent Trial and Appeal Board, Case No. IPR 2018-00488; Filed between Jan. 18, 2018-Feb. 6, 2018 (19 pages).
Decision Institution of Inter Partes Review 35 U.S.C. § 314 (a) filed in *Winplus North America, Inc. v. Pilot, Inc.*; United States Patent and Trademark Office—Before the Patent Trial and Appeal Board, Case No. IPR 2018-00488; Filed on Jul. 16, 2018 (31 pages).
Documents filed with *Winplus North America, Inc. v. Pilot, Inc.*, United States Patent and Trademark Office—Before the Patent Trial and Appeal Board, Case No. IPR 2018-00488; Filed between Jul. 19, 2018-Oct. 24, 2018 (14 pages).
Order Granting Joint Motion to Terminate Proceeding and Granting Joint Request to Treat Settlement Agreement as Business Confidential Information35 U.S.C, § 317; 37 C.F.R. § § 42.72, 42,74 filed in *Winplus North America, Inc. v. Pilot, Inc.*; United States Patent and Trademark Office—Before the Patent Trial and Appeal Board, Case No. IPR 2018-00488; Filed on Nov. 16, 2018 (4 pages).
Petition for Inter Partes Review of U.S. Pat. No. 9,007,015, including Exhibits 1001-1018; Case No. IPR 2020-00944, filed May 14, 2020 (1,100 pages).
Documents filed with *Shenzhen Carku Technology Co., Ltd., v. The Noco Company*; United States Patent and Trademark Office—Before the Patent Trial and Appeal Board, Case No. IPR 2020-00944; Filed between May 21, 2020-Aug. 17, 2020 (34 pages).
Patent Owner The Noco Company's Preliminary Response filed with *Shenzhen Carku Technology Co., Ltd., v. The Noco Company*; United States Patent and Trademark Office—Before the Patent Trial and Appeal Board, Case No. IPR 2020-00944; Filed on Aug. 21, 2020 (138 pages).
Documents filed with *Shenzhen Carku Technology Co., Ltd., v. The Noco Company*; United States Patent and Trademark Office—Before the Patent Trial and Appeal Board, Case No. IPR 2020-00944; Filed on Aug. 25, 2020 (8 pages).
Petitioner's Reply Brief filed with *Shenzhen Carku Technology Co., Ltd., v. The Noco Company*; United States Patent and Trademark Office—Before the Patent Trial and Appeal Board, Case No. IPR 2020-00944; Filed on Sep. 1, 2020 (98 pages).
Patent Owner the Noco Company's Preliminary Sur-Reply filed with *Shenzhen Carku Technology Co., Ltd., v. The Noco Company*; United States Patent and Trademark Office—Before the Patent Trial and Appeal Board, Case No. IPR 2020-00944; Filed on Sep. 4, 2020 (125 pages).
Documents filed with *Shenzhen Carku Technology Co., Ltd., v. The Noco Company*; United States Patent and Trademark Office—Before the Patent Trial and Appeal Board, Case No. IPR 2020-00944; Filed from Sep. 16, 2020-Nov. 6, 2020 (46 pages).
Decision Granting Institution of Inter Partes Review filed with *Shenzhen Carku Technology Co., Ltd., v. The Noco Company*; United States Patent and Trademark Office—Before the Patent Trial and Appeal Board, Case No. IPR 2020-00944; Filed on Nov. 12, 2020 (84 pages).
Documents filed with *Shenzhen Carku Technology Co., Ltd., v. The Noco Company*; United States Patent and Trademark Office—Before the Patent Trial and Appeal Board, Case No. IPR 2020-00944; Filed from Nov. 13, 2020-Jan. 14, 2021 (29 pages).
Patent Owner The Noco Company's Response to Petition filed with *Shenzhen Carku Technology Co., Ltd., v. The Noco Company*; United States Patent and Trademark Office—Before the Patent Trial and Appeal Board, Case No. IPR 2020-00944; Filed on Feb. 4, 2021 (507 pages).
Documents filed with *Shenzhen Carku Technology Co., Ltd., v. The Noco Company*; United States Patent and Trademark Office—Before the Patent Trial and Appeal Board, Case No. IPR 2020-00944; Filed from Feb. 5, 2021-Apr. 6, 2021 (184 pages).
Petition for Inter Partes Review of U.S. Patent No. 10,046,653, including Exhibits 1001-1014; Case No. IPR 2021-00777, filed Apr. 7, 2021 (617 pages).
Documents filed with U.S. District Court Proceedings for *Pilot, Inc. v. Winplus North America, Inc.*; U.S. District Court for the District of Colorado; Civil Action No. 1:17-cv-01183; Includes publicly available documents filed from May 12, 2017-Jun. 8, 2017; Docket Nos. 1-11; (36 pages).
Documents filed with U.S. District Court Proceedings for *Pilot, Inc. v. Anker Technology Corporation*; U.S. District Court for the District of Colorado; Civil Action No. 1:17-cv-01185; Includes publicly available documents filed from May 12, 2017-Jun. 9, 2017; Docket Nos. 1-11; (37 pages).
Documents filed with U.S. District Court Proceedings for *Pilot, Inc. v. Winplus North America, Inc.*; U.S. District Court for the Central District of California; Civil Action No. 5:17-cv-01712; Includes publicly available documents filed from Aug. 23, 2017-Oct. 8, 2018; Docket Nos. 1-59; (593 pages).
Documents filed with U.S. District Court Proceedings for *Pilot, Inc. v. Anker Technology Corporation*; U.S. District Court for the Norther District of California; Civil Action No. 4:17-cv-04918; Includes publicly available documents filed from Aug. 23, 2017-Mar. 27, 2018; Docket Nos. 1-25; (130 pages).
Documents filed with U.S. District Court Proceedings for *Pilot, Inc. v. Schumacher Electric Corporation*; U.S. District Court for the Norther District of Texas Dallas Division; Civil Action No. 3:19-cv-01676; Includes publicly available documents filed from Jul. 12, 2019-Sep. 6, 2019; Docket Nos. 1-18; (560 pages).
Documents filed with U.S. District Court Proceedings for *Pilot, Inc. v. Schumacher Electric Corporation*; U.S. District Court for the Northern District of Illinois Eastern Division; Civil Action No. 1:19-cv-05982; Includes publicly available documents filed from Sep. 6, 2019-Jul. 15, 2020; Docket Nos. 1-40; (1,233 pages).
Defendant Schumacher Electric Corporation's Corrected Initial Noninfringement, Invalidity and Unenforceability Contentions Pursuant to Local Patent Rule (LPR) 2.3—Including Exhibits I.A-I.Q (Redacted) for *Pilot, Inc. v. Schumacher Electric Corporation*; U.S. District Court for the Northern District of Illinois Eastern Division; Civil Action No. 1:19-cv-05982; Includes publicly available documents filed Nov. 25, 2019 (729 pages).
Documents filed with U.S. District Court Proceedings for *Pilot, Inc. v. Gooloo Technology LLC and Shenzhen Gooloo E-Commerce Co. Ltd.,*; U.S. District Court for the Central District of California; Civil (56) References Cited

OTHER PUBLICATIONS

Action No. 2:19-cv-09485; Includes publicly available documents filed from Nov. 4, 2019-Jan. 21, 2020; Docket Nos. 1-25; (581 pages).
Documents filed with U.S. District Court Proceedings for *Pilot, Inc.* v. *Aukey Technology Co. Ltd. and Shenzhen Aukey E-Business Co., Ltd.,*; U.S. District Court for the Central District of California; Civil Action No. 2:19-cv-09486; Includes publicly available documents filed from Nov. 4, 2019-Apr. 27, 2020; Docket Nos. 1-25; (585 pages).
Documents filed with U.S. District Court Proceedings for *Pilot, Inc.* v. *The Duracell Company*; U.S. District Court for the Northern District of Illinois Eastern Division; Civil Action No, 1:20-cv-04054; Includes publicly available documents filed from Jul. 10, 2020-Aug. 20, 2020; Docket Nos. 1-11; (663 pages).
Documents filed with U.S. District Court Proceedings for *Pilot, Inc.* v. *The Noco Company, Inc.*; U.S. District Court for the District of Arizona; Civil Action No. 2:20-cv-01452; Includes publicly available documents filed from Jul. 22, 2020-Apr. 21 , 2021; Docket Nos. 1-78; (2,799 pages).
Documents filed with U.S. District Court Proceedings for *Pilot, Inc.* v. *Battery-Biz, Inc.*; U.S. District Court Central District of California; Civil Action No. 2:20-cv-10207; Includes publicly available documents filed from Nov. 6, 2020-Jan. 29, 2021; Docket Nos. 1-35; (733 pages).
U.S. Appl. No. 14/569,352, filed Dec. 12, 2014 U.S. Pat. No. 9,525,297.
U.S. Appl. No. 15/355,409, filed Nov. 18, 2016 U.S. Pat. No. 10,046,653.
U.S. Appl. No. 15/923,219, filed Mar. 16, 2018 U.S. Pat. No. 10,328,806.
U.S. Appl. No. 16/404,321, filed May 6, 2019 U.S. Pat. No. 10,875,410.
U.S. Appl. No. 17/131,113, filed Dec. 22, 2020.
U.S. Appl. No. 17/236,279, filed Apr. 21, 2021.
U.S. Appl. No. 17/236,302, filed Apr. 21, 2021.
U.S. Appl. No. 17/236,339, filed Apr. 21, 2021.
*Pilot, Inc.* v. *Winplus North America, Inc.*; U.S. District Court for the District Court of Colorado; Civil Action No. 1:17-cv-01183.
*Pilot, Inc.* v. *Anker Technology Corporation*; U.S. District Court for the District of Colorado; Civil Action No. 1:17-cv-01185.
*Pilot, Inc.* v. *Winplus North America, Inc.*; U.S. District Court for the Central District of California; Civil Action No. 5:17-cv-01712.
*Pilot, Inc.* v. *Anker Technology Corporation*; U.S. District Court for the Northern District of California; Civil Action No, 4:17-cv-04918.
*Pilot, Inc.* v. *Schumacher Electric Corporation*; U.S. District Court. For the Northern District of Texas Dallas Division; Civil Action No. 3:19-cv-01676.
*Pilot, Inc.* v. *Schumacher Electric Corporation*; U.S. District Court for the Northern District of Illinois Eastern Division; Civil Action No. 1:19-cv-05982.
*Pilot, Inc.* v. *Gooloo Technology LLC and Shenzen Gooloo E-Commerce Co., Ltd.*; U.S. District Court Central District of California; Civil Action No. 2:19-cv-09485.
*Pilot, Inc.* v. *Aukey Technology Co., Ltd. and Shenzhen Aukey E-Business Co., Ltd.*; U.S. District Court Central District of California; Civil Action No. 2:19-cv-09486.
*Pilot Inc.* v. *The Duracell Company*; U.S. District Court for the Northern District of Illinois Eastern Division; Civil Action No. 1:20-cv-04054.
*Pilot, Inc.* v. *The Noco Company, Inc.*; U.S. District Court for the District of Arizona; Civil Action No. 2:20cv-01452.
*Pilot, Inc.* v. *Battery-Biz, Inc.*; U.S. District Court Central District of California; Civil Action No. 2:20-cv-10207.
Inter Partes Review—*Winplus North America, Inc.* v. *Pilot, Inc.*; United States Patent and Trademark Office—Before the Patent Trial and Appeal Board, Case No. IPR2018-00488.

Inter Partes Review—*Shenzhen Carku Technology Co., Ltd.* v. *The Noco Company*; United States Patent and Trademark Office—Before the Patent Trial and Appeal Board, Case No. IPR2020-00944.
Inter Partes Review—*The Noco Company, Inc.* v. *Pilot, Inc.*; United States Patent and Trademark Office—Before the Patent Trial and Appeal Board, Case No. IPR2021-00777.
Ganoza, Laura, "Re: Your Letters on Behalf of Pilot, Inc. to Baccus Global LLC Addressing Pilot Jump Starter Patents," Foley & Lardner, LLP, Dec. 15, 2020, 20 pages.
Office Action for U.S. Appl. No. 17/236,302, dated Jun. 23, 2021.
Office Action for U.S. Appl. No. 17/236,339, dated Jun. 18, 2021.
Office Action for U.S. Appl. No. 17/236,279, dated Jul. 30, 2021.
Documents filed with *Shenzhen Carku Technology Co., Ltd.*, v. *The Noco Company* ; United States Patent and Trademark Office—Before the Patent Trial and Appeal Board, Case No. IPR 2020-00944; filed Jul. 22, 2021 (439 pages).
Petition for Inter Partes Review of U.S. Pat. No. 10,046,653 including Exhibits 1001-1011; Case No. IPR IPR 2021-01232, filed Jul. 17, 2021 (737 pages).
Documents filed with *The Noco Company, Inc.*, v. *Pilot, Inc.* ; United States Patent and Trademark Office—Before the Patent Trial and Appeal Board, Case No. IPR 2021-01235; Filed between Jul. 19-Jul. 29, 2021 (14 pages).
Documents filed with U.S. District Court. Proceedings for *Pilot, Inc.* v. *Baccus Global LLC* ; U.S. District Court for the District Court of Florida West Palm Beach Division; Civil Action No. 9:21-CV-81009; Includes publicly available documents filed from Jun. 7, 2021-Jul. 30, 2021; (1,543 pages).
Documents filed with *Shenzhen Carku Technology Co., Ltd.*, v. *The Noco Company* ; United States Patent, and Trademark Office—Before the Patent Trial and Appeal Board, Case No. IPR 2920-00944; filed Aug. 5, 2021 (16 pages).
Documents filed with *Shenzhen Chic Electrics Co., Ltd.*, v. *Pilot, Inc.* ; United States Patent and Trademark Office—Before the Patent Trial and Appeal Board, Case No. IPR 2021-01232; filed between Jul. 28, 2021-Aug. 5, 2021 (15 pages).
Documents filed with U.S. District Court. Proceedings for *Pilot, Inc.* v. *The Noco Company, Inc.*; U.S. District Court For the District of Arizona; Civil Action No. 2:20-cv-01452; Includes publicly available documents filed Aug. 6, 2021; (19 pages).
PR Web Online Visibility from Vocus "Groundbreaking NOCO Genius® Boost™ Car Starter Available Commercially Beginning Oct. 6, 2014" Published Sep. 23, 2014.
Notice of Allowance for U.S. Appl. No. 17/236,339, dated Jul. 7, 2021.
Patent Owner the NOCO Company's Supplemental Response (Including Exhibit 2024) for *Shenzhen Carku Technology Co., Ltd.*, v. *The Noco Company* ; United States Patent and Trademark Office—Before the Patent Trial and Appeal Board, Case No. IPR 2020-00944; Filed Apr. 22, 2021 (124 pages).
Petitioner's Reply to Patent Owner's Response (Including Exhibits 1024-1050) for *Shenzhen Carku Technology Co., Ltd.*, v. *The Noco Company*; United States Patent and Trademark Office—Before the Patent Trial and Appeal Board, Case No. IPR 2020-00944; filed Apr. 29, 2021 (1,601 pages).
Documents filed with *Shenzhen Carku Technology Co., Ltd.*, v. *The Noco Company*; United States Patent and Trademark Office—Before the Patent Trial and Appeal Board, Case No. IPR 2020-00944; filed May 3, 2021-Jul. 12, 2021 (236 pages).
Documents filed with *The Noco Company, Inc.*, v. *Pilot, Inc.*; United States Patent and Trademark Office—Before the Patent Trial and Appeal Board, Case No. IPR 2021-00777; filed between Apr. 20-Apr. 30, 2021 (18 pages).
Petition for Inter Partes Review of U.S. Pat. No. 10,328,806 including Exhibits 1001-1012; Case No. IPR 2021-01235, filed Jul. 7, 2021 (479 pages).
Documents filed with U.S. District Court Proceedings for *Pilot, Inc.* v. *The Noco Company, Inc.*; U.S. District Court For the District of Arizona; Civil Action No. 2:20-cv-01452; Includes publicly (56) References Cited

OTHER PUBLICATIONS available documents filed Apr. 22, 2021-Jun. 11, 2021; (1,676 pages).

* cited by examiner

AUTOMOBILE CHARGER

RELATED APPLICATIONS

This application is a Continuation of U.S. patent application Ser. No. 17/131,113, filed Dec. 22, 2020, which is a Continuation of U.S. patent application Ser. No. 16/404,321, filed May 6, 2019, now U.S. Pat. No. 10,875,410, which is a Continuation of U.S. patent application Ser. No. 15/923,219, filed Mar. 16, 2018, now U.S. Pat. No. 10,328,806 which is a Continuation of U.S. patent application Ser. No. 15/355,409, filed Nov. 18, 2016, now U.S. Pat. No. 10,046,653, which is a Continuation of U.S. patent application Ser. No. 14/569,352, filed Dec. 12, 2014, now U.S. Pat. No. 9,525,297, which claims the benefit of priority of Chinese application no. 201420212173.5 filed Apr. 28, 2014, the entire contents of each are incorporated herein by reference.

BACKGROUND

The present disclosure relates to an automobile charging device, in particular relates to a novel automobile charger with a safe power supply charging quickly.

Automobile charging is a big issue of traveling by automobile for those automobile fans and businessmen, the maturity of the technology thereof is one of the critical factors restricting the application of the automobile charger. However, current automobile chargers have common problems of not able to automatically detect whether a load is connected, whether an electrode is connected with an automobile storage battery reversely, whether an automobile engine or the storage battery has a reverse current, whether the battery state is suitable for heavy current power generation and so on. Accordingly, the present disclosure provides a novel automobile charger with the safe power supply charging quickly to solve the problems mentioned above, thus making the automobile charging safe, quick, mature and propagable.

SUMMARY

A purpose of the present disclosure aims to provide a novel automobile charger with the safe power supply charging quickly, in order to solve the problems presented in the above background.

To achieve the purpose described above, the present disclosure provides the following technical solutions: a novel automobile charger comprises a direct current power supply, wherein a positive pole of the direct current power supply is connected with one end of a DC to DC module, one end of a battery voltage detection module and one end of a load module simultaneously, while a negative pole of the direct current voltage is connected with the other end of the DC to DC module, one end of a micro controller, one end of an automobile start control module and the other end of the battery voltage detection module simultaneously. A third end of the DC to DC module is connected with the other end of the microcontroller, and the other three ends of the microcontroller are connected with the third end of the battery voltage detection module, the other end of the automobile start control module and one end of the load detection module respectively, wherein the other end of the load detection module is connected with the third end of the automobile start control module and the other end of the load module simultaneously; the load module which comprises the automobile storage battery and the automobile engine is located on the end of the load module.

As a further solution of the present disclosure that: the DC to DC module provides a stable voltage for the microcontroller which collects relevant data to conduct the corresponding control. The battery voltage detection module conducts the measurement of the batter voltage, the automobile start control module conducts the power supply or the power outage for the load module through the microcontroller, and the load detection module which comprises the automobile storage battery or the automobile engine detects whether the load module is correctly connected.

As a further solution of the present disclosure that: the circuit employs an electronic switch to supply power to the load module, which can offer more protection for the product, or reduce the product size and the material cost.

As a further solution of the present disclosure that: the battery voltage detection module provides protection for the power supply battery to prevent damages caused by the discharging of the direct current power supply.

As a further solution of the present disclosure that: the load detection module prevents improper operations of the user.

As a further solution of the present disclosure that: in the standby mode, the microcontroller closes all outputs when the voltage of the direct current power supply is lower than that of the state being able to supply power and then recovers when it is higher than that of the state being able to supply power.

As a further solution of the present disclosure that: the automobile start control module is the electronic switch.

Compared to the prior art, the present disclosure has the beneficial effects that:

1. The present disclosure employs the electronic switch to control the supply power for the load, this part can offer more protection for the product, and reduce the product size and the material cost.

2. The battery detection of the present disclosure can provide low voltage protection to prevent damages caused by the over discharging of the battery.

3. The load detection of the present disclosure can prevent improper operations by the user, such as reversed polarity, which causes damages to the automobile or the direct current power supply.

4. The present disclosure employs the voltage backflow protection for abnormal load, wherein the automobile start line is closed to protect the battery when the abnormal voltage is detected.

5. The present disclosure has a fast charging function, and can be installed fixedly or moved portably according to the use requirements of people.

6. The automatic detection module of the present disclosure can automatically detects whether the load is connected, whether the electrode is connected with the automobile storage battery reversely, whether the automobile engine or the storage battery has reverse current, whether the battery state is suitable for heavy current power generation, thereby protecting the load and the circuit and thus has complete functions.

BRIEF DESCRIPTION OF DRAWINGS

In figures: 1—DC to DC module, 2—microcontroller, 3—battery voltage detection module, 4—automobile start control module, 5—load detection module, 6—load module, 7—direct current power supply.

DETAILED EMBODIMENTS

The technical solutions of the present disclosure will be described more clearly and fully in conjunction with drawings in the embodiments of the present disclosure, and obviously, the described embodiments are merely a part of the embodiments of the present disclosure, not all the embodiments. Based on the embodiments of the present disclosure, all the other embodiments obtained by the ordinary skilled in the art without creative labors belong to the scope claimed by the present disclosure.

Figure 1:
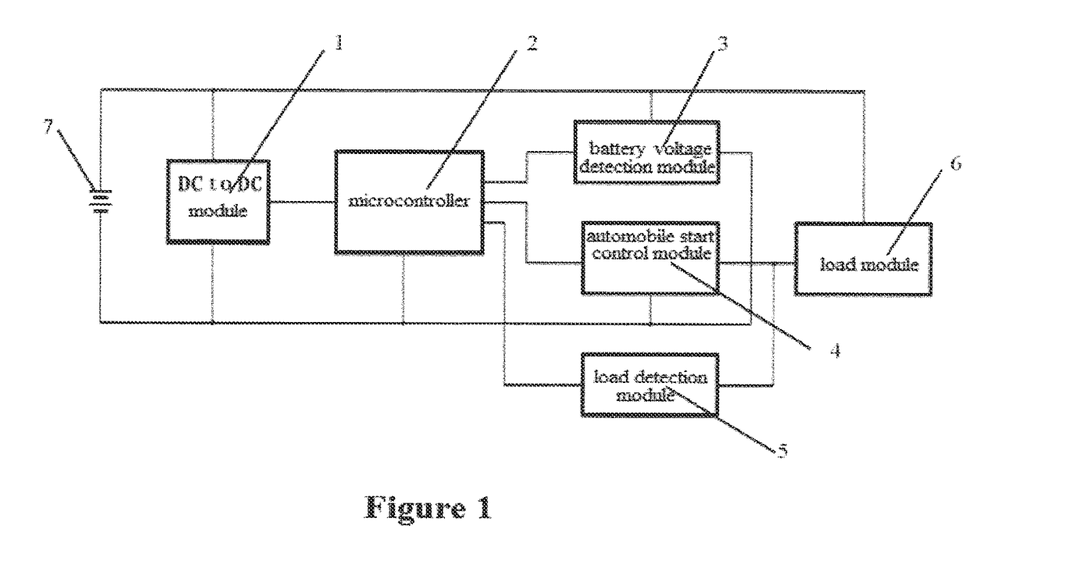
FIG. 1 is a block diagram for the principle of the emergency power supply of the safe intelligent automobile.

Refer to FIG. 1, a novel automobile charger comprises a direct current power supply, wherein the positive pole of the direct current power supply is connected with one end or lead of the DC to DC module, one end of the battery voltage detection module and one end of the load module simultaneously, while the negative pole of the direct current voltage is connected with the other end of the DC to DC module, one end of the microcontroller, one end of the automobile start control module and the other end of the battery voltage detection module simultaneously. A third end of the DC to DC module is connected with the other end of the microcontroller, and the other three ends of the microcontroller are connected with the third end of the battery voltage detection module, the other end of the automobile start control module and one end of the load detection module respectively, wherein the other end of the load detection module is connected with the third end of the automobile start control module and the other end of the load module simultaneously; the load module which comprises the automobile storage battery and the automobile engine is located on the end of the load module.

Figure 2:
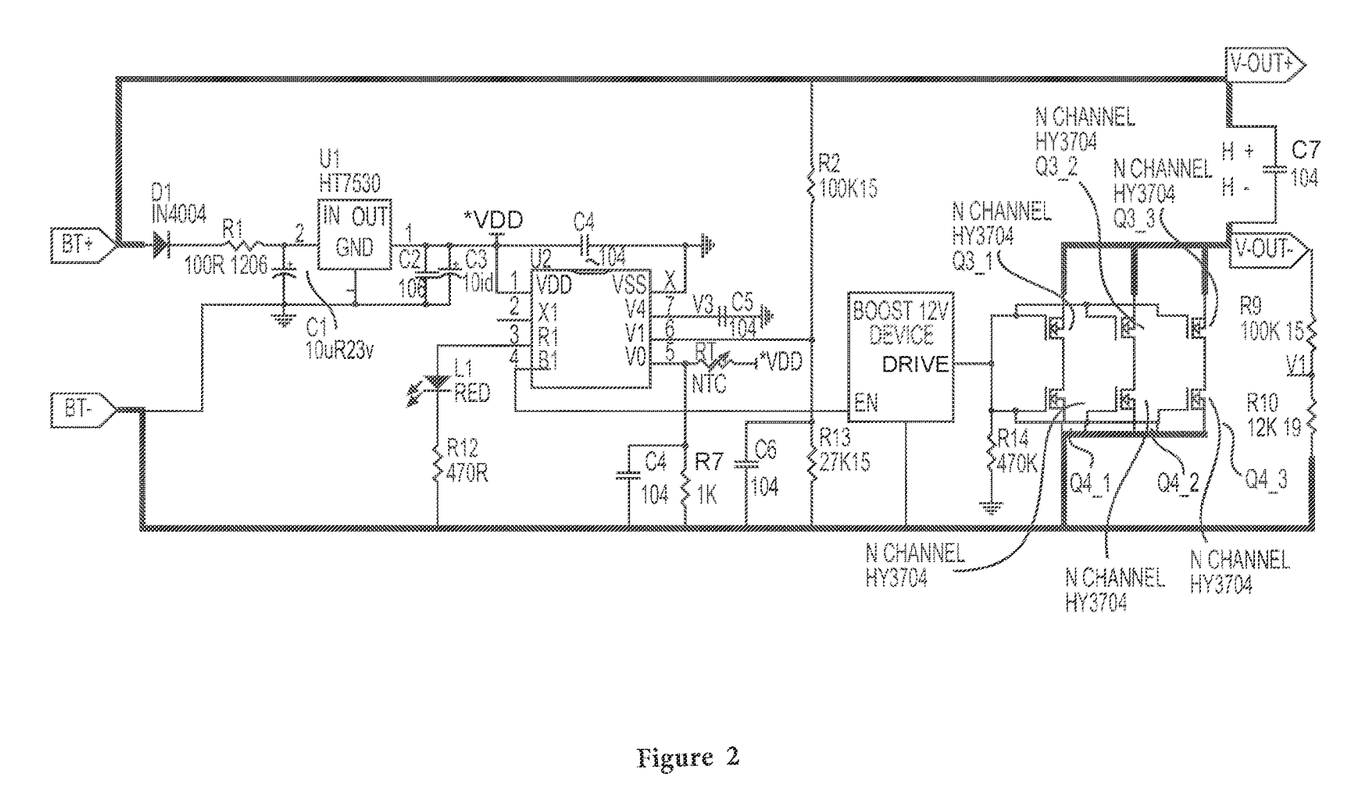
FIG. 2 is a circuit diagram for the emergency power supply of the safe intelligent automobile.

Refer to FIG. 2, the DC to DC module comprises a diode D1, a resistor R1, capacitor C1, a HT7530 voltage stabilizing tube, capacitors C2 and C3, wherein the positive pole of the diode D1 is connected with the positive pole of the battery, the negative pole of the diode D1 is connected with one end of the capacitor C1 and an IN port of the HT7530 voltage stabilizing tube simultaneously through the resistor R1, and an OUT port of the HT7530 voltage stabilizing tube is connected with one end of the capacitor C2, one end of the capacitor C3 and a VDD port of the microcontroller U2, while the other end of the capacitor C1, the other end of the capacitor C2 and the other end of the capacitor C3 as well as a GND port of the HT7530 voltage stabilizing tube are grounded and connected with the negative pole of the battery simultaneously; a R1 port of the microcontroller U2 is connected with the negative pole of the battery through a light-emitting diode L1 and a resistor R12 which are in series connection, a B1 port of the microcontroller U2 is connected with a EN port of the automobile start control module, a V0 port of the microcontroller U2 is connected with the negative pole of the battery through a capacitor C4 and a resistor R7 which are in parallel connection, the V0 port is also connected with the VDD port through a slide rheostat RT, a V1 port of the microcontroller U2 is also connected with the negative pole of the battery through a resistor 10, a capacitor C6 and a resistor R13 which are in parallel connection, the V1 port is connected with the positive pole of the battery through a resistor R2, and is also connected with the negative pole of the automobile storage battery and the automobile engine simultaneously through a resistor R9, wherein two ends of the automobile storage battery are in parallel connection with the capacitor C7, resistors R9, 10, a capacitor C6 and a resistor R13 to form the load detection module together, a V4 port of the microcontroller U2 is grounded through a capacitor C5, a VSS port of the microcontroller U2 and one end of the capacitor C4 are grounded simultaneously. The other end of the capacitor C4 is connected with the VDD port of the microcontroller U2, the resistors R2, R13 and capacitor C6 form the battery voltage detection module together, and a Drive port of the automobile start control module is connected with the automobile engine and one end of a resistor R14 simultaneously, wherein the other end of the resistor R14 is grounded.

The DC to DC module in the present disclosure provides the stable voltage for the microcontroller which collects relevant data to conduct the corresponding control. The battery voltage detection module conducts the measurement of the batter voltage, and the automobile start control module conducts the power supply or the power outage for the load module through the microcontroller, wherein the load detection module detects whether the load module is correctly connected.

The microcontroller in the present disclosure determines whether the automobile storage battery is connected with the automobile engine through the load detection module, wherein the automobile start control model is automatically activated and the battery starts to supply power to the load module when the load is correctly connected; the automobile start control model is automatically deactivated and the battery stops supplying power to the load module when assuming that the load is not connected or the positive and negative polarities are reversely connected. In the standby mode, the microcontroller closes all outputs when the battery voltage is lower than 9V, and recovers the normal operation only when the battery voltage is larger than 10V; the automobile engine will generate the normal voltage to recharge the battery after the automobile starts, whereas the automobile start control module is deactivated immediately once the recharging voltage is larger than the voltage before that battery starts the power supply, to protect the battery from damages caused by charging with the normal voltage; the automobile start control module is the electronic switch, which can prevent the load from being reversely connected and recharging of the normal voltage, thus protecting the battery and prolonging lifespan.

The automobile engine will generate abnormal voltage to recharge the direct current power supply after the automobile starts, and the automobile start control module is deactivated immediately once the recharging voltage is larger than the voltage before the direct current power supply starts the power supply, to protect the direct current power supply from damages caused by charging with normal voltage charge.

It is obvious for the skilled people in the art that the present disclosure is not merely limited to the details of the above exemplary embodiments, and the present disclosure can be implemented in other specific forms without departing from the sprits or the basic features of the present disclosure. Thus, no matter to consider from which point of view, the embodiments should be considered as exemplary and non-limiting. The scope of the present disclosure is defined by the accompanying Claims rather than the above description, therefore it is intended that all the changes fallen within the meanings and scope of the equivalent elements of the Claims are contained in the present disclosure. Any drawing reference in the Claims should not be regarded as limiting the Claims involved.

Furthermore, it should be understood that although the specification is described according to the embodiments, but not every embodiment includes only an independent technical solution, this manner of description for the specification is only for clarity, therefore the skilled people in the art should take the Specification as a whole, and the technical solutions in various embodiments can be combined appropriately to form other implementations understandable for those skilled in the art.

What is claimed is:

1. A jumpstarter comprising:
a battery connected to a voltage regulator, the battery capable of supplying power, via the voltage regulator, to at least a microcontroller, the battery also capable of supplying power to an automobile battery when the battery has at least a predetermined voltage;
a load detector circuit, connected to the microcontroller, to detect when the jumpstarter is correctly connected to the automobile battery;
the microcontroller generating, when the jumpstarter is correctly connected to the automobile battery, an output signal; and
switching circuitry, including at least one switch, to operatively connect the battery to the automobile battery when the microcontroller generates the output signal to supply a charging current to the automobile battery.

2. The jumpstarter of claim 1, further comprising a battery voltage detector circuit to detect a battery voltage of the battery.

3. The jumpstarter of claim 1, wherein the at least one switch is one or more MOSFETs.

4. The jumpstarter of claim 3, wherein the one or more MOSFETSs are n-channel MOSFETs.

5. The jumpstarter of claim 1, wherein there are a plurality of switches.

6. The jumpstarter of claim 1, wherein the at least one switch is a plurality of MOSFETs.

7. The jumpstarter of claim 6, wherein the plurality of MOSFETs are connected in parallel.

8. The jumpstarter of claim 6, wherein the plurality of MOSFETs are connected in a series-parallel topology.

9. The jumpstarter of claim 1, further comprising a load detector to detect a reverse polarity connection to the automobile battery.

10. The jumpstarter of claim 1, wherein the microprocessor includes a standby mode where all outputs are closed.

11. The jumpstarter of claim 10, further wherein the microcontroller closes all outputs when a voltage of the direct current power supply is lower than that of a state being able to supply power.

12. The jumpstarter of claim 10, wherein the jumpstarter is in a standby mode when the battery has less than 9 volts.

13. The jumpstarter of claim 10, wherein the jumpstarter is not in a standby mode when the battery has more than 10 volts.

14. The jumpstarter of claim 10, wherein the jumpstarter is in a normal mode when the battery has more than 10 volts.

15. The jumpstarter of claim 1, wherein the supply power to the automobile battery is 12 volts.

16. The jumpstarter of claim 1, wherein the predetermined voltage is 10 volts.

17. The jumpstarter of claim 1, further comprising a start control module to prevent recharging of a normal voltage of the battery.

18. The jumpstarter of claim 1, further composing a start control module to stop supplying battery power when there is no load.

19. The jumpstarter of claim 1, wherein the at least one switch switches a negative voltage.

20. The jumpstarter of claim 1, wherein the at least one switch is connected to a negative battery terminal.

21. The jumpstarter of claim 1, wherein the jumpstarter has a fast charging function.

22. The jumpstarter of claim 1, further comprising a voltage back-flow protection.

23. The jumpstarter of claim 22, wherein the voltage back-flow protection for an abnormal load.

24. The jumpstarter of claim 1, wherein the microcontroller determines whether a battery state is suitable for heavy current power generation.

* * * * *

(12) INTER PARTES REVIEW CERTIFICATE (3541st)
United States Patent (10) Number: US 11,124,077 K1
Wang et al. (45) Certificate Issued: Apr. 1, 2024

(54) AUTOMOBILE CHARGER

(71) Applicants: Chung-Hsin Wang; Calvin Shiening Wang

(72) Inventors: Chung-Hsin Wang; Calvin Shiening Wang

Trial Number:

IPR2022-01237 filed Jul. 1, 2022

Inter Partes Review Certificate for:

Patent No.: 11,124,077
Issued: Sep. 21, 2021
Appl. No.: 17/236,260
Filed: Apr. 21, 2021

The results of IPR2022-01237 are reflected in this inter partes review certificate under 35 U.S.C. 318(b).

INTER PARTES REVIEW CERTIFICATE
U.S. Patent 11,124,077 K1
Trial No. IPR2022-01237
Certificate Issued Apr. 1, 2024

AS A RESULT OF THE INTER PARTES REVIEW PROCEEDING, IT HAS BEEN DETERMINED THAT:

Claims 1-24 are cancelled.

\* \* \* \* \*